H. YARDLEY.
CLAMPING DEVICE OR JIG.
APPLICATION FILED DEC. 12, 1912.

1,066,357.

Patented July 1, 1913.

WITNESSES
R. A. Balderson
S. F. McConim

INVENTOR
Harry Yardley
by Bakewell, Byrnes Parmelee
Attys.

UNITED STATES PATENT OFFICE.

HARRY YARDLEY, OF GLOUCESTER CITY, NEW JERSEY, ASSIGNOR TO WELSBACH LIGHT COMPANY, OF GLOUCESTER CITY, NEW JERSEY, A CORPORATION OF NEW JERSEY.

CLAMPING DEVICE OR JIG.

1,066,357.  Specification of Letters Patent.  Patented July 1, 1913.

Application filed December 12, 1912. Serial No. 736,382.

*To all whom it may concern:*

Be it known that I, HARRY YARDLEY, a citizen of the United States, residing at Gloucester City, Camden county, New Jersey, have invented a new and useful Improvement in Clamping Devices or Jigs, of which the following is a full, clear, and exact description, reference being had to the accompanying drawings, forming part of this specification, in which—

Figure 1:
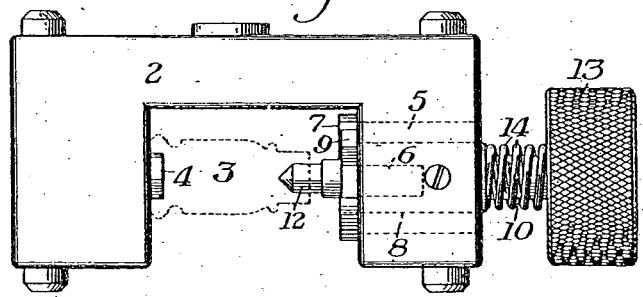
Figure 2:
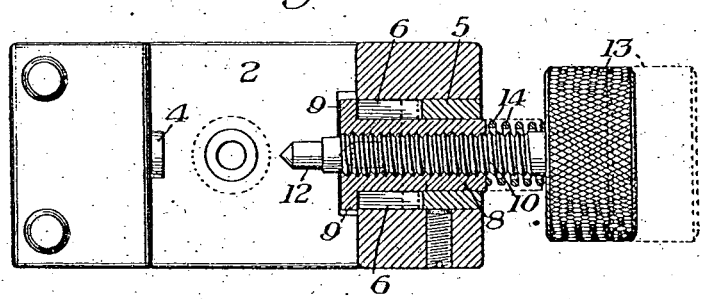
Figure 3:
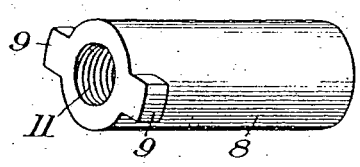
Figure 4:
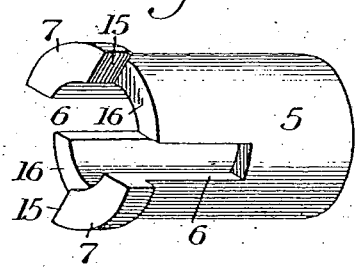

Figure 1 is a side view of a clamping device or jig embodying my invention; Fig. 2 is an inverted plan view of the same, partly in section; and Figs. 3 and 4 are perspective views of two of the members of the device.

My invention has relation to clamping devices, more especially adapted for use in connection with jigs; and is designed to provide a simple device of this character in which the work piece, or other part to be held, can be quickly set and clamped in position.

The nature of my invention will be best understood by reference to the accompanying drawings, in which I have shown one embodiment thereof, and which will now be described, it being premised, however, that various changes may be made in the details of construction and arrangement of the parts without departing from the spirit and scope of the invention as defined in the appended claims:

In the drawings, the numeral 2 designates the body of a jig, which is of inverted U-form to provide opposite abutment portions between which the work piece indicated at 3 is held. One of these abutments is formed with suitable means, such as the stud 4, for centering said piece. Rigidly secured in the other leg or abutment is a sleeve member 5, which is formed with opposite longitudinal slots 6 extending into its inner end. The inner end of this sleeve member is also formed adjacent to one edge of each slot 6 with a segmental forwardly projecting lug 7.

8 is a sleeve nut, having at its forward end the diametrically opposite lugs or projections 9, which are adapted to slide in the slots 6.

10 is a clamping screw whose thread engages the interior thread 11 of the nut 8. This clamping screw has a holding point 12 at its inner end, and is shown as provided with a large milled actuating handle member 13.

14 is a spring which is interposed between the handle member and the outer end of the sleeve nut 8. When the lugs 9 are in line with the slots 6, the screw 10 and nut 8 can be moved freely longitudinally in the sleeve member 5. This enables the point 12 of the screw to be quickly moved in against the end of the work piece. Then, by a slight rotary movement, the lugs 9 will engage the stop ends 15 of the projection 7, thereby locking the sleeve nut from further rotation, and the further turning movement of the handle 13 will cause said screw to turn on its threaded bearing in the nut 8. The engagement of the lug 7 with the end surfaces 16 of the sleeve member holds the screw and sleeve against backward movement.

My invention provides a clamping device of extremely simple and convenient character, in which the work piece or other object to be clamped can be quickly set and secured, since only a partial turning of the screw is required to set the clamp. In the ordinary common screw clamp four or five complete turns of the screw are usually necessary. In the present device, the pieces can be located and clamped in the jig with less than a quarter of a turn of the screw, the exact amount depending on the shape of the part which the screw clamps against.

It will be obvious that my improved clamp can be applied to a variety of different forms of jigs and holding devices.

I claim:—

1. A clamping device comprising a nut member, having an interior thread, a clamping screw engaging the thread, and a bearing member, the nut and bearing members having coöperating slots and projections whereby the nut and screw may be moved freely through the bearing member, or the nut member may be locked thereto by pressure of the clamping screw against the work; substantially as described.

2. A clamping device, comprising a clamping screw, a nut member threaded on the screw and having projections, and a bearing member formed with slots to receive the projections, and having stop projections at its inner end for engagement with the projections of the nut member; substantially as described.

3. A clamping device of the character described, comprising a clamping screw, a nut member threaded on the screw, and a bearing member within which the nut member is freely movable longitudinally, the nut and bearing members having portions whereby they may be locked to each other by a slight rotary movement of the nut member and the resulting pressure of the clamping screw against the work; substantially as described.

In testimony whereof I have hereunto set my hand.

HARRY YARDLEY.

Witnesses:
J. H. JOHNSON,
EDGAR LENTON.